United States Patent
Collis et al.

(10) Patent No.: US 9,175,950 B2
(45) Date of Patent: Nov. 3, 2015

(54) POSITION MEASUREMENT

(71) Applicant: ROLLS-ROYCE PLC, London (GB)

(72) Inventors: Andrew Collis, Isle of Wight (GB); Richard Andreou, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/366,085

(22) PCT Filed: Dec. 18, 2012

(86) PCT No.: PCT/EP2012/075965
§ 371 (c)(1),
(2) Date: Jun. 17, 2014

(87) PCT Pub. No.: WO2013/092596
PCT Pub. Date: Jun. 27, 2013

(65) Prior Publication Data
US 2014/0312229 A1 Oct. 23, 2014

(30) Foreign Application Priority Data
Dec. 21, 2011 (GB) .................................. 1122000.1

(51) Int. Cl.
G01B 11/14 (2006.01)
G01B 11/00 (2006.01)
G01B 21/00 (2006.01)
G01B 21/04 (2006.01)
B25J 11/00 (2006.01)

(52) U.S. Cl.
CPC ................. *G01B 11/14* (2013.01); *B25J 11/00* (2013.01); *G01B 11/002* (2013.01); *G01B 21/042* (2013.01); *G01B 21/045* (2013.01)

(58) Field of Classification Search
CPC ....... B25J 11/00; G01B 11/002; G01B 11/14; G01B 21/042; G01B 21/045
See application file for complete search history.

(56) References Cited

U.S. PATENT DOCUMENTS

| 4,396,945 A | 8/1983 | DiMatteo et al. |
| 5,889,550 A | 3/1999 | Reynolds |
| 6,163,946 A | 12/2000 | Pryor |

FOREIGN PATENT DOCUMENTS

WO  WO 2007/124010 A2  11/2007

OTHER PUBLICATIONS

International Search Report issued in International Patent Application No. PCT/EP2012/075965 dated Apr. 16, 2013.
Written Opinion issued in International Patent Application No. PCT/EP2012/075965 dated Apr. 16, 2013.

*Primary Examiner* — Mark R Gaworecki
(74) *Attorney, Agent, or Firm* — Oliff PLC

(57) ABSTRACT

A measurement fixture has a plurality of optically-detectable elements, preferably infrared LEDs. In use, an object is attached in fixed spatial relationship to the fixture, and an optical measuring device detects the elements to provide relative tracking of the object relative to a reference. This allows for improved control and accuracy, particularly in machining operations and in the control of robots.

12 Claims, 3 Drawing Sheets

POSITION MEASUREMENT

Figure 1:
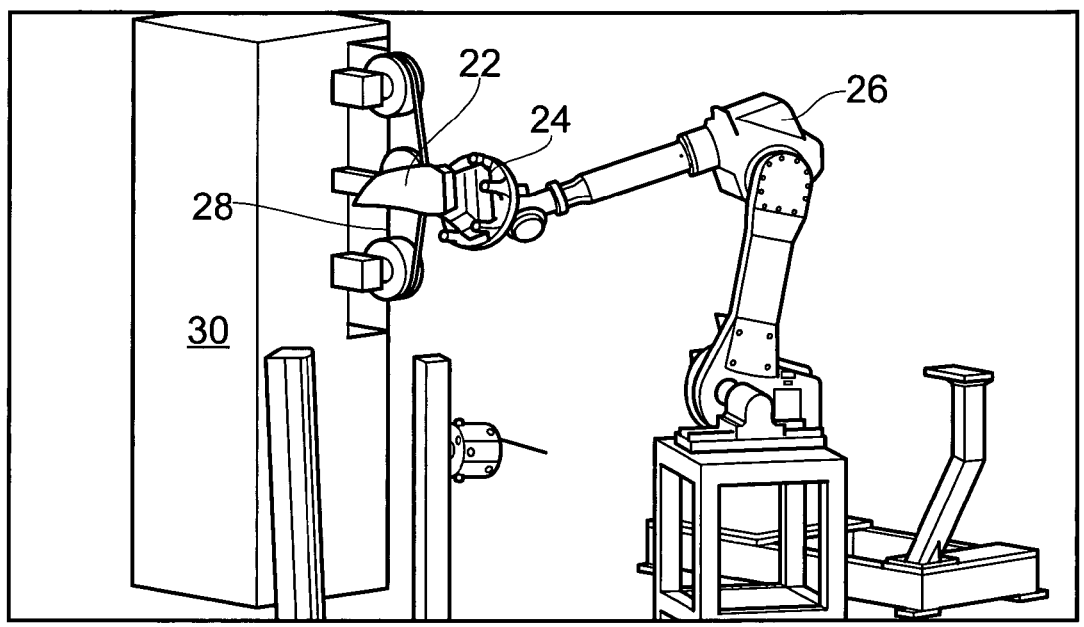

This invention relates to position measurement, and particularly to methods and apparatus for determining and correcting the position and orientation of an object relative to another reference, which may or may not be fixed. The invention has particular relevance to robotic handling arrangements for machining and similar applications.

Robotic handling of objects is well known in a number of technical fields. One particular application of robotic handling is in the machining of parts, where the part is mounted in a fixture on a robotic arm. The movement of the robotic arm is controlled by a computer to present the part to a machining tool and to move the part relative to the tool so that the correct material removal is achieved.

To ensure accurate and repeatable machining, it is necessary to know the precise position of the part relative to the robotic arm and relative to the machining tool. It is common for the part to be made with a datum face or datum feature, which can be located repeatably against a corresponding feature on the fixture. This ensures predictable positioning of the part relative to the fixture, but it cannot correct for any inaccuracy or drift in the positioning of the robotic arm.

Previous attempts to address this problem have typically used an optical measurement system quasi-statically, where the robotic arm is moved to a defined position in which it is measured, and then guided back to CAD nominal position. The data from the camera is analysed to determine the position in space (relative to some notional "fixed" frame of reference) of the robotic arm, so that any positional error in the robotic arm's coordinate system can be corrected. This may be done, for example, by instructing the controlling computer to superimpose a positional correction on subsequent movement commands.

Among the disadvantages of this approach are that it only measures the inaccuracy at a single position and at a single time, and that the normal operation of the apparatus must be interrupted to carry out the calibration measurement. The cameras used in such systems generally have a relatively restricted field of view, because the measurement is always performed in the same position.

It would be advantageous to be able to perform the measurement continuously, so that the correction could be dynamically adjusted without interrupting normal operation, and this is an aim of the invention. To achieve this, it is necessary both that the measurement can be performed regardless of the position or orientation of the robotic arm and the part, and that the measurement process and equipment do not impede the operation that is being performed on the part. Because both the measurement and the correction can be performed continuously, the movements of the robotic arm can be much smoother than in known systems. This facilitates continuous path processes, to ensure higher accuracy is obtained.

The invention provides a measurement fixture, a measurement system and a method of determining the position and orientation of an object as set out in the claims.

Figure 2:
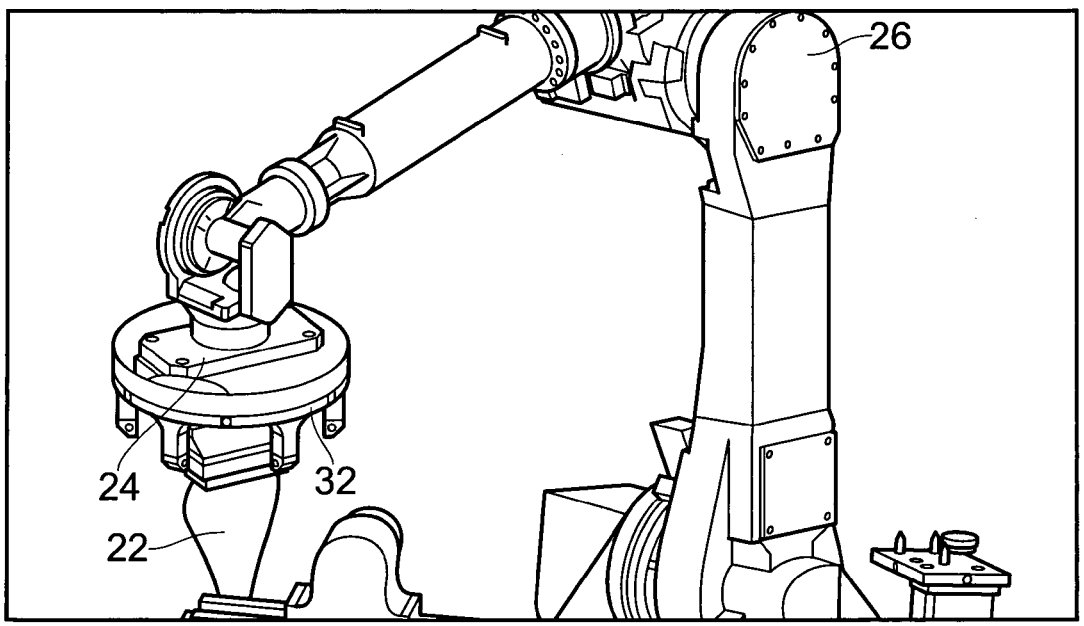
Figure 3A:
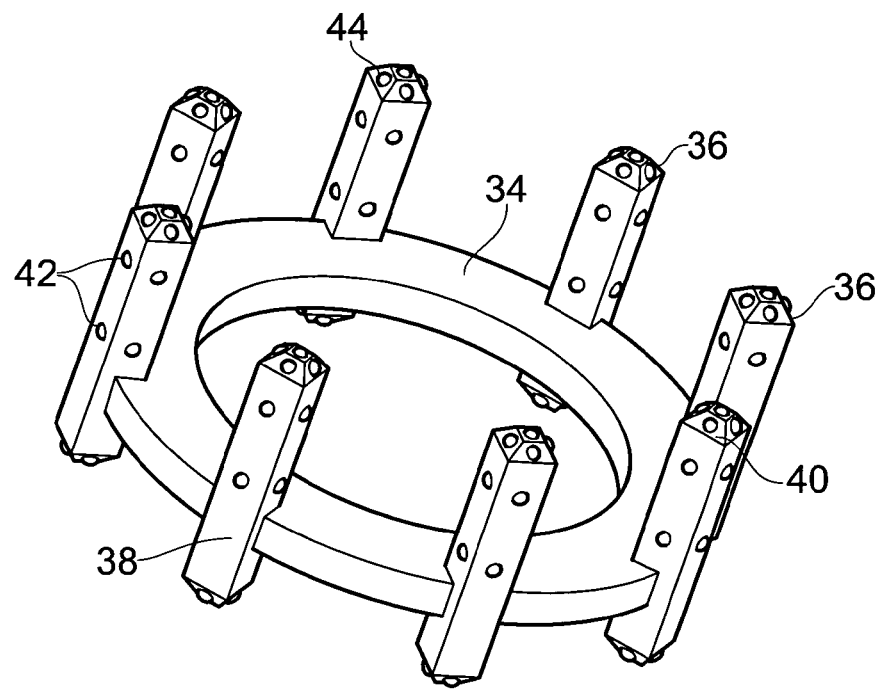
Figure 3B:
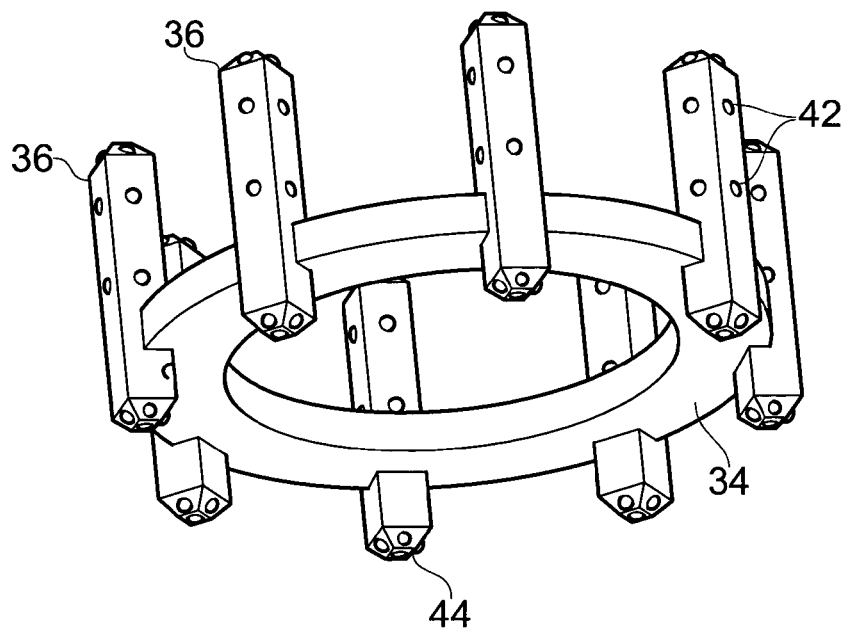
Figure 4:
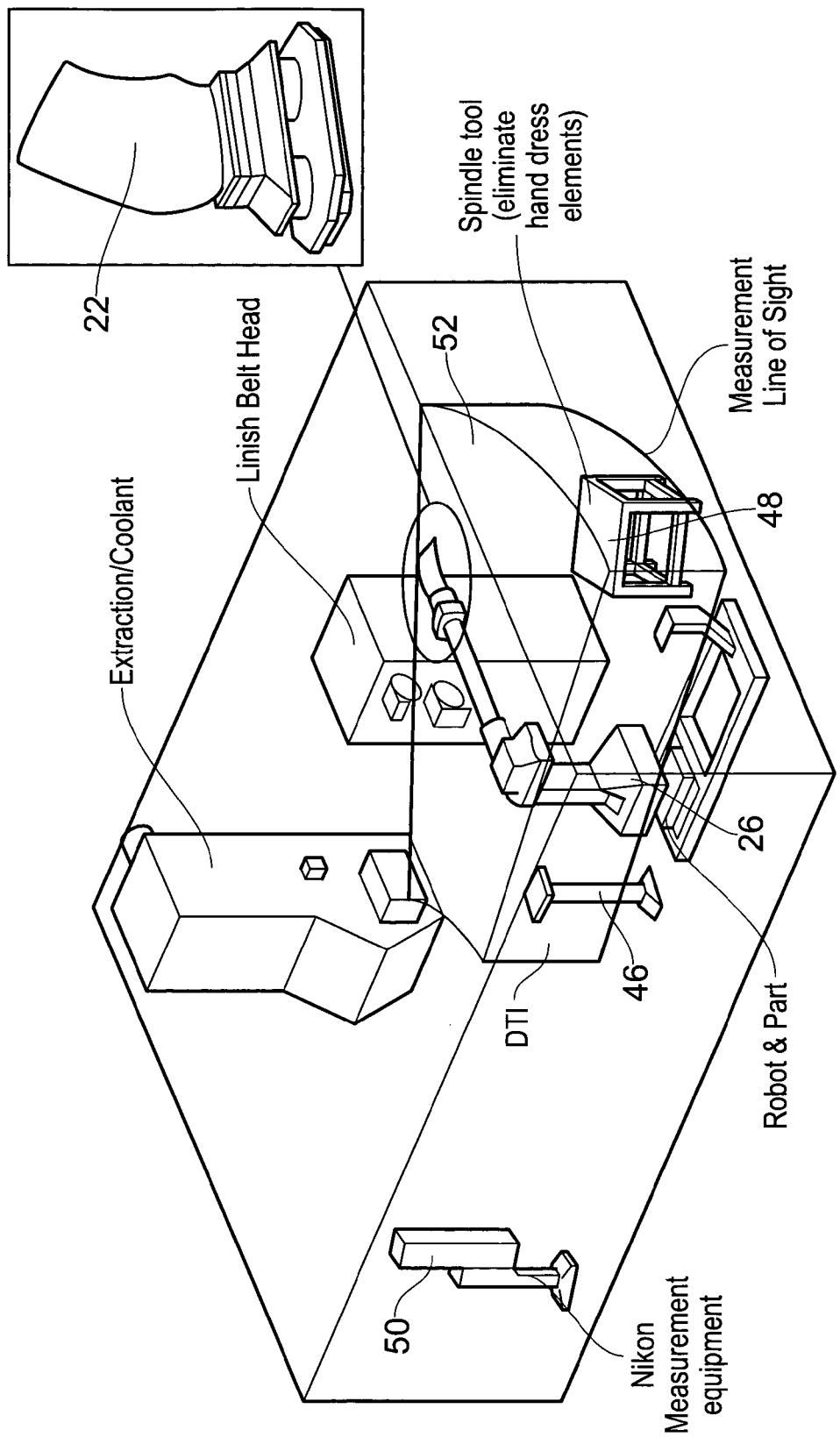

The invention will now be described in more detail, by way of example, with reference to the accompanying drawings in which FIG. 1 is a schematic view of part of a machining cell;

FIG. 2 is a schematic view of part of a robotic arm;

FIGS. 3(*a*) and 3(*b*) show different perspective views of a measurement fixture according to a first aspect of the invention; and FIG. 4 is a schematic view of a machining cell embodying the invention.

Referring firstly to FIG. 1, an object—in this case a blade 22 for a gas turbine engine—is mounted in a mounting fixture 24 on a robotic arm 26. The robotic arm is a multi-axis device of known type. In this embodiment a Fanuc M710i robot was used. A control system (not shown) controls the robotic arm 26 to present the surfaces of the blade 22 to an abrasive belt 28 of a linishing machine 30.

FIG. 2 shows a more detailed view of part of the robotic arm 26. The blade 22 is mounted in the mounting fixture 24 on the end of the robotic arm. Also mounted on the robotic arm 26 is a measurement fixture 32.

FIGS. 3(*a*) and 3(*b*) show two views of the measurement fixture 32, detached from the robotic arm 26. The measurement fixture 32 comprises a circular, annular base 34 which in use can be mounted to the robotic arm 26 without impeding the operation of the mounting fixture 24. Eight projections or posts 36 are mounted to the base 34, and extend perpendicularly to the plane of the base 34 (i.e. in the axial direction of the base). Each post 36 is square in cross-section, with four rectangular faces 38, and extends axially from both sides of the base 34. The two ends of each post 36 are pyramidal in shape, each end having four triangular faces 40.

Optically-detectable elements are mounted in the faces 38 and 40. In this embodiment the optically-detectable elements are infrared LEDs. Two LEDs 42 are mounted in each face 38 and one LED 44 is mounted in each face 40. The LEDs 42, 44 are powered by a power source (not shown) and controlled by a controller (not shown).

As will be clearly seen from FIGS. 3(*a*) and 3(*b*), not all of the LEDs 42, 44 will be visible at once from any given observation position. In FIG. 3(*b*), for example, some of the LEDs are hidden by the base 34.

If a blade is mounted within the measurement fixture, as shown in FIG. 2, then still more LEDs will be hidden. However, a significant number of LEDs 42, 44 will still be visible at any time, whatever the orientation of the measurement device or the position of the observer.

FIG. 4 is a schematic view of a machining cell. As in FIG. 1, a robotic arm 26 has a mounting fixture 24 to hold a blade 22, and a measurement fixture 32 having a plurality of LEDs 42, 44. There are three stations in the cell—a linishing machine 30, a DTI 46 and a spindle tool 48. A camera 50 is mounted approximately 3.5 m from the robot arm 26. This functions as an optical measuring device for the cell. The camera 50 has a field of view indicated by the shaded region 52.

During operation of the cell, the control system directs the robotic arm 26 to move a blade 22 between the stations 30, 46, 48. As it does so, the camera captures data from its field of view, and specifically from all the LEDs 42, 44 that are not obscured. The data from the camera is fed to image processing software which forms part of the control system. The image processing software detects the positions of the visible LEDs, and from this information can determine the exact position and orientation of the measurement device 32. If the position and orientation so determined are incorrect, the control system instructs correctional movements of the robotic arm to move it to the correct position and orientation. These correctional movements can be incorporated into the normal programmed movements of the robotic arm, so that the machining cell operations are not interrupted.

The metrology system uses a camera with three linear CCD arrays. This enables high frequency measurements (up to 1 KHz) of active infrared LEDs. The camera is pre-calibrated by mounting a calibrated probe, with the same type of active LEDs, on to a coordinate measuring machine (CMM). The optical position of the probe (represented by the LEDs) is compared to the position in the CMM over a dense grid within the camera's working volume. From this a calibration grid is calculated, providing a reference for future measurements. Whenever a LED is subsequently introduced (through the metrology control system) into the camera's field of view the position of the LED is measured in the camera's coordinate system.

Provided that three or more LEDs are in the camera's field of view, attached to the same rigid body, a 6D reference frame can be measured and tracked. If more than three LEDs are in the field of view, then confidence in the measurement and tracking is increased.

In this embodiment of the invention, the LEDs are controlled by a control system (not shown) to switch on and off at a known frequency and in a known sequence ("strobed") so that the LEDs are intermittently illuminated. The metrology system can determine (from the control system) which LED is on at any given time and therefore knows which LED or LEDs it is detecting. This means that if more LEDs are connected, the overall measurement frequency can be reduced.

The metrology system has multiple measurement ports, facilitating multiple frame tracking. This is a feature of Nikon's proprietary system called "Dynamic Reference" where one frame system can be tracked with respect to another, with the reference frame system itself moving. This enables the control of either the robot holding a (moving) part to a (stationary) machine, or the robot holding a (moving) machine to a (stationary) part. In both cases the reference frames need not be static.

The invention allows full visibility around a blade or other component to a precision of 100 μm (3 σ), consistent with the capability of the metrology system. This is significantly better than can be achieved in previously known methods.

In this embodiment of the invention, the LEDs are strobed during operation of the cell. However, it may in some circumstances be advantageous to have the LEDS continuously "on", with the image processing software able to recognise the patterns and sequences to identify which LEDs are being observed. The positional data from the LEDs can then be used to determine the position and orientation of the measurement device. Alternatively, differently coloured and/or differently polarised LEDs could be used in different positions or on different parts of the measurement fixture. The number of LEDs and their geometric spacing may also be used to improve system performance and to reduce measurement uncertainty.

The invention therefore provides a measurement fixture that is visible in all positions throughout the operating range of the robot, but which does not obstruct access to the part that is to be processed.

It will be appreciated that the embodiment described above is only illustrative, and that the invention may be put into practice in other ways. For example, it may be employed in the control of robots for other purposes, or to control the positioning of cranes. It may also be employed without a robot, in such as "on-the-fly" machining as part of a continuous process.

The measurement fixture may be of a different shape or configuration to suit the size or shape of the part to be processed or of the device it is to be attached to, provided that sufficient LEDs can be mounted all around it. In particular, it may be convenient for it to be octagonal or hexagonal. In some embodiments, it may be advantageous for the measurement fixture to be C- or horseshoe-shaped, so that a gap is provided in the fixture through which tooling or parts may be inserted or removed. This may be particularly beneficial in a production line environment, so that stuck or broken parts may be easily removed from around the measurement fixture.

If posts are used, they may be of different shape or size than those in the embodiment described, or there may be a different number of them. For example, the posts may be triangular or circular. The posts need not all be of the same size and shape. For certain sizes and shapes of parts, it may be convenient for the posts not to be perpendicular to the base.

The posts may be attached to the base of the measurement device, or may be formed integrally with it. Alternatively, the LEDs may be mounted on features other than posts provided that they can be suitably spaced apart.

The measurement device may incorporate air, hydraulic or electrical supplies to power clamping fixtures. The measurement device may be made integrally with such a clamping fixture.

In certain embodiments it may be advantageous to use more than one measurement device. For example, for a relatively long part a measurement device could be attached to each end of it.

The total number of LEDs, and the number and spacing of the LEDs around the measurement device, may be varied as required for particular applications.

LEDs have the advantages of low power consumption and long life. Infrared LEDs, in particular, produce radiation invisible to the human eye, so that they will not interfere with other systems that may be in use or with the operators' ability to visually interact with the apparatus. Infrared LEDs are also relatively insensitive to the presence of mist, fog and small airborne particles. However, it is envisaged that the invention could be put into practice using alternative optically-detectable elements such as incandescent bulbs or dots of reflective or fluorescent material.

If the measurement fixture is to be used in a wet or dirty environment, it may be advantageous to protect the LEDs so that they do not become obscured by dirt or fluids. They may, in these circumstances, be provided with a protective coating; or each LED may be arranged to have a constant flow of clean water across its face to prevent contamination, or a positive air flow may be arranged to surround the LEDs or the entire fixture to prevent contamination.

More cameras may be used to ensure that sufficient information can be captured from the LEDs at all times, even when parts of the measurement device are obscured.

In a machining cell, different stations and/or a different number of stations may be provided.

The arrangement could be mounted the other way around, with the part to be machined being stationary and the robot manipulating a machine tool to perform the machining. In this case, the measurement device would be mounted in fixed spatial relationship to the machine tool.

The invention claimed is:

1. A measurement fixture for use in determining the position and orientation of an object, the measurement fixture mountable in use in a fixed spatial relationship with the object and comprising:
    a plurality of optically-detectable elements that in use can be detected by an optical measuring device remote from the measurement fixture, the optically-detectable elements being distributed around the measurement fixture such that in use at least three reference points are within the field of view of the optical measuring device for all positions and orientations of the object;
    a base; and
    a plurality of projections extending from the base,
    the optically-detectable elements being located on the plurality of projections, and the optically-detectable elements being equally spaced around the projections in at least three positions.

2. A measurement fixture according to claim 1, wherein in use, the object is modified by a tool, and the geometry of the measurement fixture is arranged to permit unobstructed access of the tool to the object in use.

3. A measurement fixture according to claim 2, wherein the measurement fixture is mounted in use at one end of the object.

4. A measurement fixture according to claim 1, wherein in use, the object is subjected to a machining operation.

5. A measurement fixture according to claim 1, wherein the plurality of projections extend from the base generally perpendicularly to the plane of the base.

6. A measurement fixture according to claim 1, wherein in use the base extends around the object at least 180°.

7. A measurement fixture according to claim 1, wherein the projections comprise prisms whose bases have at least three sides.

8. A measurement fixture according to claim 1, wherein the ends of the projections comprise pyramids and optically-detectable elements are located on the faces of the pyramids.

9. A measurement fixture according to claim 1, wherein the optically-detectable elements are intermittently illuminated in use.

10. A measurement fixture according to claim 1, wherein the optically-detectable elements are light-emitting diodes.

11. A measurement fixture for use in determining the position and orientation of an object, the measurement fixture comprising:

a substantially planar circular base mountable in use in a fixed spatial relationship with the object and a plurality of projections mounted on the base and extending in a direction substantially perpendicular to the plane of the base, the projections having a substantially square cross-section; and a plurality of light-emitting diodes spaced apart on the sides and ends of each projection.

12. A method of determining the position and orientation of an object relative to a reference, comprising:

mounting the object in a fixed spatial relationship with a measurement fixture, the measurement fixture having a plurality of optically detectable elements;

detecting the positions of at least some of the elements;

detecting the position and orientation of the reference;

comparing the detected positions to determine the position and orientation of the measurement fixture relative to the reference; and if the determined position and orientation differ from a predetermined desired position and orientation, applying a correction to the position and orientation.

* * * * *